United States Patent
Nakamatsu et al.

(10) Patent No.: US 10,958,140 B2
(45) Date of Patent: Mar. 23, 2021

(54) MOTOR

(71) Applicant: Nidec Corporation, Kyoto (JP)

(72) Inventors: Shuhei Nakamatsu, Kyoto (JP); Takayuki Migita, Kyoto (JP); Hisashi Fujihara, Kyoto (JP); Masato Aono, Kyoto (JP); Takashi Shiraishi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 40 days.

(21) Appl. No.: 16/479,286

(22) PCT Filed: Jan. 6, 2018

(86) PCT No.: PCT/JP2018/000133
§ 371 (c)(1),
(2) Date: Jul. 19, 2019

(87) PCT Pub. No.: WO2018/142844
PCT Pub. Date: Aug. 9, 2018

(65) Prior Publication Data
US 2019/0386545 A1 Dec. 19, 2019

(30) Foreign Application Priority Data
Feb. 2, 2017 (JP) .............................. JP2017-017758

(51) Int. Cl.
*H02K 5/15* (2006.01)
*H02K 11/215* (2016.01)
(Continued)

(52) U.S. Cl.
CPC ............. *H02K 11/215* (2016.01); *H02K 1/28* (2013.01); *H02K 5/161* (2013.01)

(58) Field of Classification Search
CPC ...... H02K 29/08; H02K 11/215; H02K 11/21; H02K 5/15
See application file for complete search history.

(56) References Cited

U.S. PATENT DOCUMENTS 10,103,606 B2 10/2018 Yamada et al.
10,270,306 B2 4/2019 Yamada et al.
(Continued)

FOREIGN PATENT DOCUMENTS

CN 104811005 A 7/2015
CN 205489998 U 8/2016
(Continued)

OTHER PUBLICATIONS

Official Communication issued in International Patent Application No. PC/JP2018/000133, dated Apr. 3, 2018.
(Continued)

*Primary Examiner* — Dang D Le
(74) *Attorney, Agent, or Firm* — Keating & Bennett

(57) ABSTRACT

A motor includes a magnet rotating together with a rotor about a central axis, a substrate on which a sensor to detect a position of the magnet is installed, a housing to hold a stator to drive the rotor, a bearing assembly including a bearing holder, and a conductor assembly between the housing and the bearing assembly. The conductor assembly includes a conductor including a first conductor electrically connected to the sensor through the substrate and a conductor holder covering the conductor. The substrate is fixed to the conductor holder. In the radial direction, a gap is located between an outer side surface of the bearing holder and an inner side surface of the conductor holder, and at least a portion of the magnet is located in the gap.

11 Claims, 8 Drawing Sheets

(51) Int. Cl.
*H02K 1/28* (2006.01)
*H02K 5/16* (2006.01)

(56) References Cited

U.S. PATENT DOCUMENTS

| | | |
|---|---|---|
| 2006/0125334 A1 | 6/2006 | Kataoka et al. |
| 2008/0211357 A1 | 9/2008 | Kataoka et al. |
| 2013/0193812 A1* | 8/2013 | Oishi ............... F16C 35/12 310/68 B |
| 2017/0019007 A1 | 1/2017 | Sadanaga |

FOREIGN PATENT DOCUMENTS

| | | |
|---|---|---|
| JP | 2010-158154 A | 7/2010 |
| JP | 2014-155381 A | 8/2014 |

OTHER PUBLICATIONS

Official Communication issued in corresponding Chinese Patent Application No. 201880009740.8, dated Sep. 1, 2020.

* cited by examiner

MOTOR

CROSS REFERENCE TO RELATED APPLICATIONS

This is the U.S. national stage of PCT Application No. PCT/JP2018/000133, filed on Jan. 6, 2018, and priority under 35 U.S.C. § 119(a) and 35 U.S.C. § 365(b) is claimed from Japanese Application No. 2017-017758, filed Feb. 2, 2017; the entire disclosures of which are incorporated herein by reference.

1. FIELD OF THE INVENTION

The present disclosure relates to a motor.

2. BACKGROUND

With the miniaturization of a device, a demand for the miniaturization of a motor mounted on the device is also increasing. When components of the motor are assembled, the components are often mounted in an axial direction in an overlapping manner, so that dimensions in an axial direction are likely to be large. Thus, for example, in a related art, a sensor magnet configured to detect a rotational position of a rotor is installed in an outer side of a bearing support in a radial direction, and a position sensor is installed on an outer side surface of the bearing support, thereby suppressing an increase in dimensions of the motor in the axial direction. Further, in a related art, a Hall integrated circuit (IC) formed on a front end plate and a sensor magnet installed on a magnet fixing member are disposed on an outer side in a radial direction of a bearing, which supports a shaft.

However, when the number of components of a motor increases, the number of assembly processes increases so that the work efficiency is likely to be lowered. In addition, when the components are arranged in a radial direction, the structure of the motor is also complicated, so that the assembling is more likely to be difficult.

SUMMARY

An example embodiment of the present disclosure provides a motor including a rotor rotatable about a central axis extending in a vertical direction, a stator facing the rotor in a radial direction to drive the rotor, a housing to hold the stator, a bearing located on a position higher than the stator in an axial direction to rotatably support the rotor, a bearing assembly including a bearing holder to hold the bearing, a magnet rotating together with the rotor, a sensor to detect a position of the magnet, a substrate on which the sensor is installed, and a conductor assembly between the housing and the bearing assembly, wherein the conductor assembly includes a conductor, and a conductor holder covering the conductor, wherein the conductor includes a first conductor electrically connected to the sensor through the substrate, the substrate is fixed to the conductor holder, in the radial direction, a gap is located between an outer side surface of the bearing holder and an inner side surface of the conductor holder, and at least a portion of the magnet is located in the gap.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described below with reference to the drawings.

Further, in the present specification, in a motor 100, a direction parallel to a central axis CA is referred to as an "axial direction". Also, in the axial direction, a direction from a housing unit 110 toward a bearing assembly 130 is referred to as "upward", and a direction from the bearing assembly 130 toward the housing unit 110 is referred to as "downward". Also, in surfaces of each component, a surface facing upward in the axial direction is referred to as an "upper surface", and a surface facing downward in the axial direction is referred to as a "lower surface".

Further, a direction orthogonal to the central axis CA is referred to as a "radial direction", and a circumferential direction about the central axis CA is referred to as a "circumferential direction". In addition, in the radial direction, a direction toward the central axis CA is referred to as "inward", and a direction away from the central axis CA is referred to as "outward". Also, in side surfaces of each component, a side surface facing inward in the radial direction is referred to as an "inner side surface", and a side surface facing outward in the radial direction is referred to as an "outer side surface".

Further, designations of directions and surfaces described above do not indicate the positional relationship and direction in the case of being incorporated into an actual device.

Figure 1:
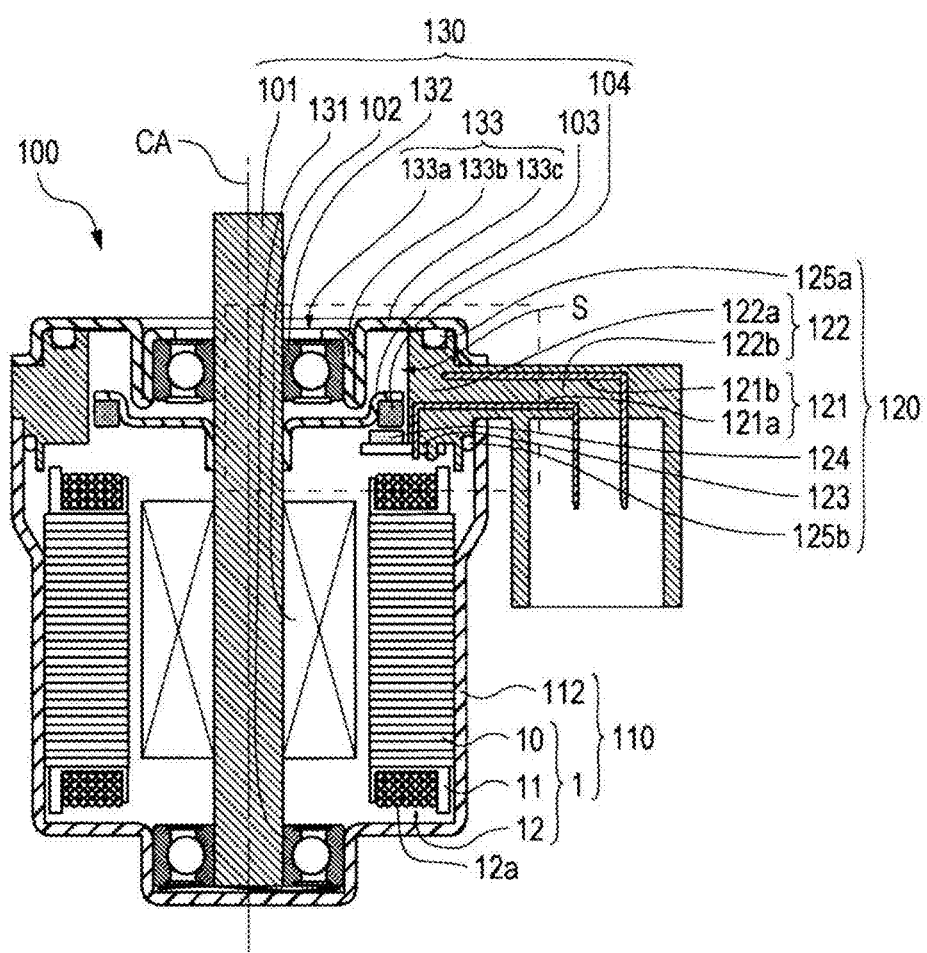
FIG. 1 is a cross-sectional view illustrating a configuration example of a motor according to a first example embodiment of the present disclosure.

FIG. 1 is a cross-sectional view illustrating a configuration example of a motor 100 according to a first example embodiment. In FIG. 1, the motor 100 is cut at a cut surface including a central axis CA. This also applies to FIGS. 2 to 8 which are illustrated as other cross-sectional views to be described later. The motor 100 is an inner-rotor type as shown in FIG. 1 and includes a housing unit 110, a conductor assembly 120, and a bearing assembly 130.

The housing unit 110 includes a stator 1 and a housing 112. The conductor assembly 120 also includes a conductor 121, a conductor holder 122, a substrate 123, a sensor 124, and O-rings 125a and 125b. The conductor assembly 120 is sandwiched between the housing 112 and the bearing assembly 130 through the O-rings 125a and 125b. Further, the bearing assembly 130 includes a shaft 101, a rotor 102, a magnet holder 103, a magnet 104 for a sensor, a first bearing 131, a second bearing 132, and a bearing holder 133.

The shaft 101 is a rotating shaft rotatable about the central axis CA extending in a vertical direction and rotatably supported by the first bearing 131 and the second bearing 132.

The rotor 102 is mounted on the shaft 101 and is rotatable with the shaft 101 about the central axis CA. The rotor 102 includes a magnet (not shown) for rotational driving, and faces an inner side surface of the stator 1 in a radial direction.

The magnet holder 103 is a ring-shaped member that supports the magnet 104 for the sensor 124 and is mounted on the shaft 101 between the rotor 102 and the second bearing 132. The magnet holder 103 and the magnet 104 rotate together with the shaft 101 and the rotor 102. The magnet 104 for the sensor 124 is an annular-shaped member in which an S-pole and an N-pole are alternately magnetized in a circumferential direction.

The stator 1 has an annular shape, faces the rotor 102 in the radial direction, and drives the rotor 102. The stator 1 includes a stator core 10, an insulator 11, and a plurality of coils 12.

The stator core 10 is an iron core member in which a plurality of plate-shaped members each obtained by punching, for example, an electromagnetic steel plate are laminated. The stator core 10 includes a core back having an annular shape and a plurality of teeth extending inward in the radial direction from an inner side surface of the core back. Each of the coils 12 is configured by winding a conducting wire 12a around each tooth through the insulator 11.

When a driving current is supplied to the coils 12, radial magnetic flux is generated in the stator core 10. The stator 1 causes this magnetic flux to magnetically act on magnetic flux of a magnet for rotationally driving the rotor 102 to cause the rotor 102 to generate torque in the circumferential direction. Thus, the rotor 102 rotates with the shaft 101, the magnet 104 for a sensor, and the magnet for rotational driving about the central axis CA.

In addition, the stator 1 may further include an intermediate bus bar (not shown). The intermediate bus bar is installed on the insulator 11 and electrically connected to the coils 12. A second conductor 121b to be described below is electrically connected to the coils 12 through the intermediate bus bar. In this manner, the coils 12 of the stator 1 may be electrically connected to the second conductor 121b on the stator 1 side (that is, on a lower side in the axial direction) than the conductor assembly 120 in the axial direction. Thus, a gap S, which will be described below, between the bearing holder 133 and the conductor assembly 120 may be easily secured.

The housing 112 holds the stator 1 and the first bearing 131. The first bearing 131 is located on a position lower than the stator 1 in the axial direction and rotatably supports the shaft 101 in a lower side in the axial direction.

The conductor 121 includes a plurality of first conductors 121a and a plurality of second conductors 121b. Each of the first conductor 121a and the second conductor 121b includes a straight-shaped part (not shown) and an arc-shaped part (not shown) extending in the circumferential direction from the straight-shaped part. The first conductor 121a is electrically connected to the substrate 123. The sensor 124 is mounted on the substrate 123, and thus the first conductor 121a is electrically connected to the sensor 124 through the substrate 123. The driving current is supplied to the stator 1 through the second conductor 121b. More specifically, the second conductor 121b includes one end electrically connected to the conducting wire 12a of the plurality of coils 12, and the other end connected to an external power supply (not shown), thereby supplying the driving current to each of the coils 12. The first conductor 121a and the second conductor 121b are bus bars made of a copper plate in the present example embodiment, but the present disclosure is not limited to this example, and the first conductor 121a and the second conductor 121b may be a wire made of a metal wire coated with, for example, an insulating member.

The conductor holder 122 is made of resin, covers the conductor 121, and holds the conductor 121. The conductor assembly 120 is an integrally molded product of the conductor 121 and the conductor holder 122. The conductor holder 122 includes an annular part 122a and a connector part 122b. The annular part 122a covers the arc-shaped part of the first conductor 121a and the arc-shaped part of the second conductor 121b. The connector part 122b covers the straight-shaped part of the first conductor 121a and the straight-shaped part of the second conductor 121b. Further, the connector part 122b has a shape in which a cross-section thereof viewed from the circumferential direction is an L-shape, and is connected to the annular part 122a in the radial direction. That is, the annular part 122a and the connector part 122b are an integrally molded product. One end of each of the plurality of first conductors 121a is exposed through a lower surface of the annular part 122a. Further, although not illustrated in FIG. 1, one end of each of the plurality of second conductors 121b is exposed through an inner side surface of the annular part 122a and electrically connected to the conducting wire 12a withdrawn from the coil 12 upward in the axial direction. One ends of the plurality of first conductors 121a and the other ends of the second conductor 121b are exposed through an end of the connector part 122b, which extends in the axial direction. Thus, the conductor 121 and the conductor holder 122 may not be separately mounted when assembling the motor 100, thereby reducing the number of assembly processes of the motor 100.

The substrate 123 is, for example, a resin circuit board on which electronic components are mounted, and is fixed to the conductor holder 122. More specifically, the substrate 123 has an arc shape corresponding to the annular part 122a of the conductor assembly 120. In the radial direction, the inner diameter of the substrate 123 is smaller than the inner diameter of the annular part 122a, and the outer diameter of the substrate 123 is smaller than the outer diameter of the annular part 122a. The substrate 123 is in contact with and fixed to the lower surface of the annular part 122a. Further, an inner peripheral edge of the substrate 123 in the radial direction is located inward in the radial direction than the inner peripheral edge of the annular part 122a. Thus, the sensor 124 mounted on an upper surface of the substrate 123 is located inward in the radial direction than the annular part 122a, and faces an inner side surface of the annular part 122a. The substrate 123 is fixed by thermal welding in which a portion of the annular part 122a is melted. The substrate 123 is electrically connected to the one end of the first conductor 121a exposed through the lower surface of the annular part 122a by soldering. Further, the substrate 123 is located at a position that does not interfere with a connection part between the one end of the first conductor 121a and the conducting wire 12a withdrawn from the coil 12.

In the first example embodiment, the substrate 123 is installed on the stator 1 side (that is, on a lower side in the axial direction) than the conductor holder 122 and the magnet 104 in the axial direction, and is mounted on a lower surface of the conductor holder 122. In this manner, when assembling the motor 100, for example, the housing unit 110, the conductor assembly 120, and the bearing assembly 130 are assembled. That is, first, the conductor assembly 120 is mounted on the housing unit 110. Thereafter, the motor 100 is completed by mounting the bearing assembly 130. Thus, the assembly work of the motor 100 is facilitated by assembling individual parts into the units and then mounting the units to each other. Further, the assembling method is not limited thereto, and for example, the O-rings 125a and 125b may be mounted alone without being unitized into the conductor assembly 120.

The sensor 124 is, for example, a chip-type Hall device, and a plurality of (for example, three) sensors 124 are installed on the substrate 123 at intervals in the circumferential direction, and the sensor 124 detects a rotational position of the magnet 104 rotating together with the rotor 102. In the first example embodiment, the sensor 124 is installed on the upper surface of the substrate 123 and overlaps a portion of the trajectory of the rotating magnet 104 when viewed from the axial direction. More specifically, the sensor 124 faces the magnet 104 in the axial direction. Thus, the size of the motor 100 in the radial direction may be suppressed to be increased as compared with the case in which the sensor 124 faces a portion of the trajectory of the rotating magnet 104 in the radial direction.

The second bearing 132 is located on a position higher than the stator 1 in the axial direction and rotatably supports the rotor 102 in an upper side in the axial direction. More specifically, the second bearing 132 rotatably supports the rotor 102 by rotatably supporting the shaft 101 together with the first bearing 131.

The bearing holder 133 is mounted on an upper end of the conductor holder 122 in the axial direction through the O-ring 125a. The bearing holder 133 includes an opening 133a through which the shaft 101 is inserted when viewed from the axial direction, a holder 133b holding the second bearing 132 on an outer side of the opening 133a in the radial direction, and a cover 133c covering an upper surface and an outer side surface of the conductor holder 122. The opening 133a is installed at a central portion of the bearing holder 133. The cover 133c is installed on an outer side of the holder 133b in the radial direction.

Further, in the radial direction of the bearing holder 133, the holder 133b has a cylindrical shape fitted to an outer side surface of the second bearing 132, and is located on a position lower than the cover 133c in the axial direction. The outer diameter of the holder 133b is sufficiently smaller than the inner diameter of the conductor holder 122. Thus, the gap S having an annular shape is formed between an outer side surface of the holder 133b and an inner side surface of the conductor holder 122. More specifically, since the outer diameter of the holder 133b is sufficiently smaller than the inner diameter of the annular part 122a, the gap S is formed between the holder 133b and the annular part 122a. The gap S is a space formed by the outer side surface of the holder 133b and the inner side surface of the conductor holder 122 facing each other in the radial direction. However, even when the length of the outer side surface of the holder 133b and the length of the inner side surface of the conductor holder 122 differ from each other in the axial direction, or the outer side surface of the holder 133b and the inner side surface of the conductor holder 122 have unevenness, a space between the outer side surface of the holder 133b and the inner side surface of the conductor holder 122 facing each other in the radial direction is referred to as the gap S. Further, the bearing holder 133 is formed by punching a single metal plate, but the present disclosure is not limited to such a method, and the same shape may be formed by another processing method, or the bearing holder 133 may be configured by mounting a plurality of parts.

In the first example embodiment, as shown in FIG. 1, a portion of the magnet 104 is located in the gap S. Further, the present disclosure is not limited to this example, and the entire magnet 104 may be located in the gap S. Since at least a portion of the magnet 104 is located in the gap S, an increase in size of the motor 100 in the axial direction may be suppressed, and the enlargement of the motor 100 may be suppressed. That is, the example embodiment may contribute to the miniaturization of the motor 100.

Further, when the substrate 123 is mounted on the conductor holder 122, the position of the substrate 123 may be determined by bringing the substrate 123 into contact with the conductor holder 122. In addition, one end of the first conductor 121a is exposed on the contact surface, so that the first conductor 121a may be easily brought into contact with a conductive part (for example, a wiring pattern) of the substrate 123. The connection of the conductive part and the first conductor 121a may be performed, for example, by soldering or press-fit bonding. Further, the substrate 123 may be fixed by thermal welding by mounting the substrate 123 on the conductor holder 122 made of resin. However, the present disclosure is not limited to such a method, and another fixing method such as snap fitting may also be applied for the fixing of the substrate 123. Thus, the first conductor 121a and the sensor 124 may be easily electrically connected to each other.

Figure 2:
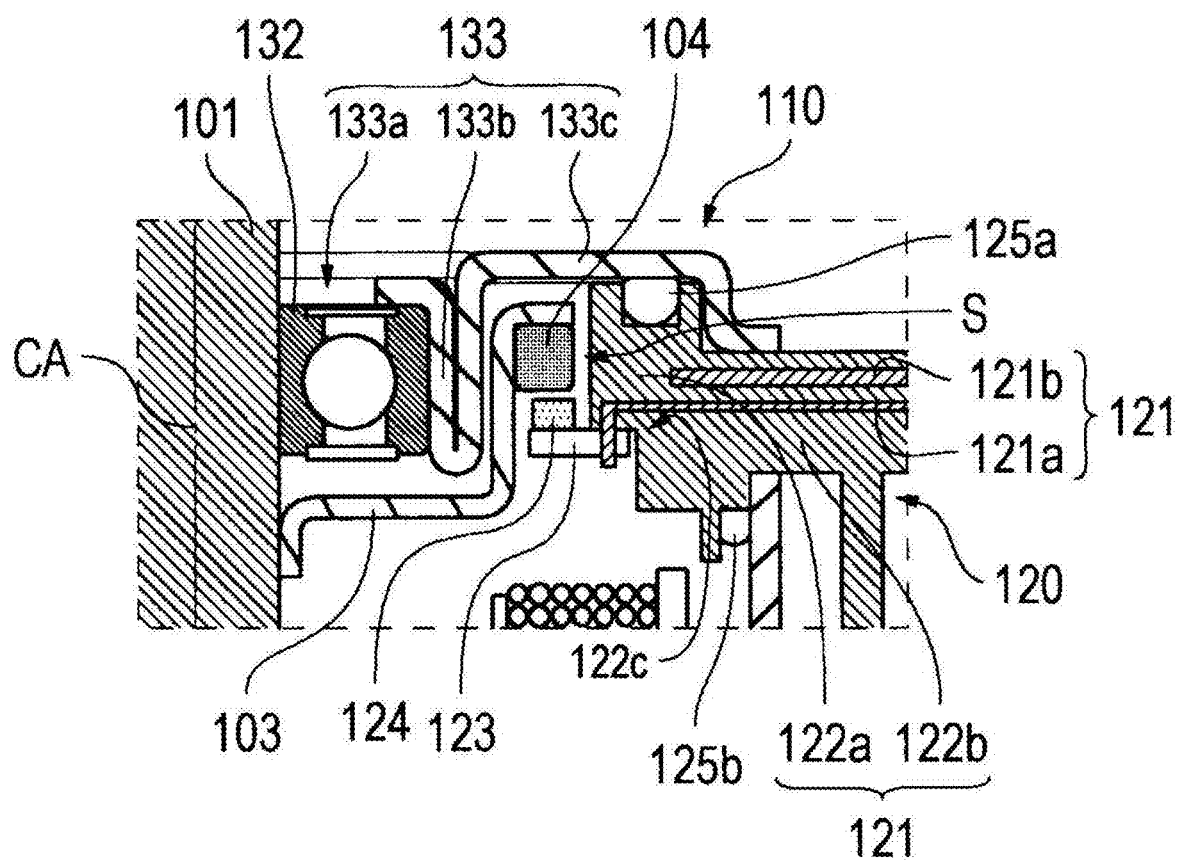
FIG. 2 is an enlarged cross-sectional view illustrating the arrangement of a magnet, a sensor, and a substrate according to a modified example of the first example embodiment of the present disclosure.

In the above-described first example embodiment, the substrate 123 and the sensor 124 are located outside the gap S as shown in FIG. 1, but the present disclosure is not limited to this example, the substrate 123 and the sensor 124 may be located inside the gap S. FIG. 2 is an enlarged cross-sectional view illustrating the arrangement of a magnet 104, a sensor 124, and a substrate 123 according to a modified example of the first example embodiment. Further, FIG. 2 corresponds to the structure of a range enclosed by a broken line in FIG. 1.

In the modified example, the substrate 123 is located in a gap S between a bearing holder 133 and a conductor holder 122 as illustrated in FIG. 2. Further, a notch 122c having an arc shape and extending in a circumferential direction is formed on a lower surface of an annular part 122a of the conductor holder 122. The notch 122c is formed by notching a region including an inner peripheral edge in a radial direction of the lower surface of the annular part 122a in an axial direction toward an upper side of the region. The substrate 123 and the sensor 124 are located inside the gap S by mounting the substrate 123 on the notch 122c. A magnet 104 is located upward in the gap S in the axial direction by extending an outer peripheral side of a magnet holder 103 upward in the axial direction. Thus, not only the magnet 104 but also the substrate 123 and the sensor 124 may be located inside the gap S. In this manner, in the first example embodiment (see FIG. 1), a portion of the magnet 104, the substrate 123, and the sensor 124 are pushed downward in the axial direction from the gap S, but the space, into which a portion of the magnet 104, the substrate 123, and the sensor 124 are pushed, in the first example embodiment may be reduced by the configuration of the modified example. Thus, the motor 100 may be miniaturized, and in particular, the size in the axial direction may be miniaturized. Further, a coil 12 and the substrate 123 are further spaced apart from each other, and thus electrical insulation therebetween is easy to achieve. In addition, the work of connecting a conducting wire 12a withdrawn from the coil 12 to one end of a first conductor 121a is facilitated.

In the modified example, the entire sensor 124 is located in the gap S as shown in FIG. 2. In addition, the present disclosure is not limited to this example, a portion of the sensor 124 may be located in the gap S. Since at least a portion of the sensor 124 is located in the gap S, an increase in size of the motor 100 in the axial direction may be suppressed, and the enlargement of the motor 100 may be suppressed. In particular, the size of the motor 100 in the axial direction may be reduced. That is, the modified example may contribute to the miniaturization of the motor 100.

Next, a second example embodiment will be described. Configurations of the second example embodiment, which are different from the first example embodiment and the modified example thereof, will be described below. In addition, the same configurations as those in the first example embodiment and the modified example thereof may be denoted by the same reference numerals and descriptions thereof may be omitted.

Figure 3:
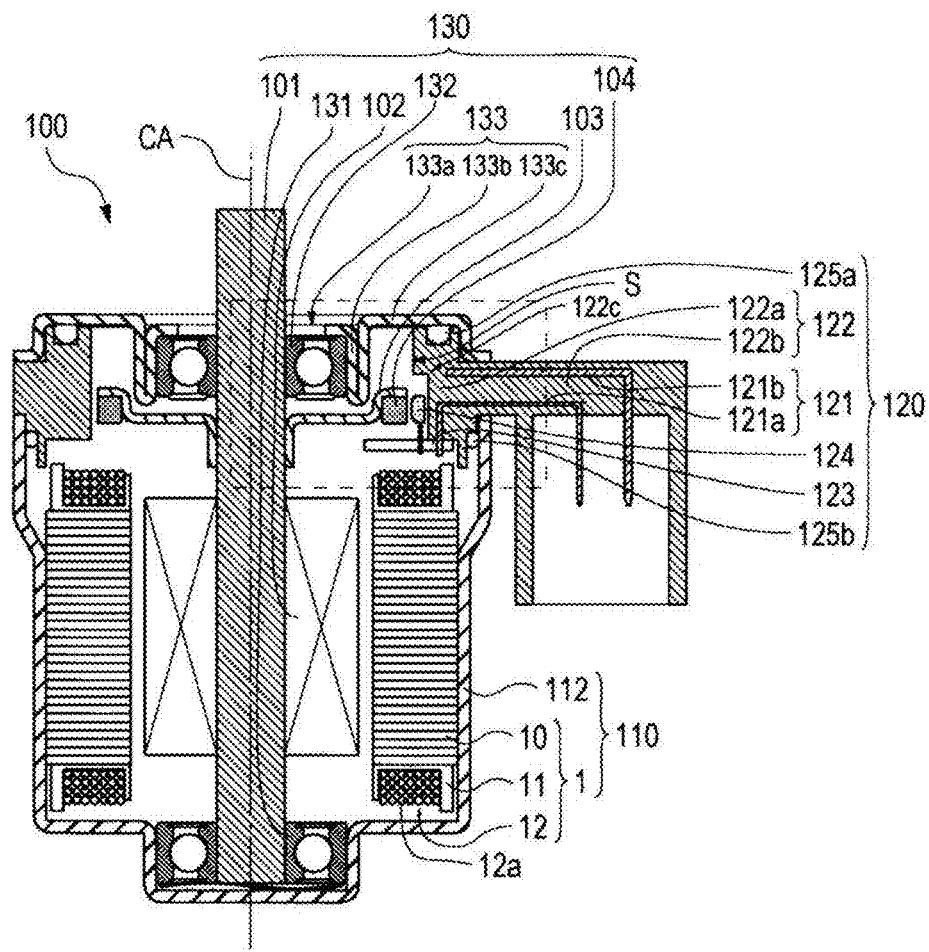
FIG. 3 is a cross-sectional view illustrating a configuration example of a motor according to a second example embodiment of the present disclosure.

FIG. 3 is a cross-sectional view illustrating a configuration example of a motor 100 according to a second example embodiment.

In the second example embodiment, a sensor 124 is a lead-type Hall device and is mounted on an upper surface of a substrate 123 as shown in FIG. 3. The sensor 124 overlaps a portion of the trajectory of a rotating magnet 104 in a radial direction. More specifically, the sensor 124 faces the magnet 104 in the radial direction. Further, in FIG. 3, a notch 122c which is notched outward in the radial direction to the extent that a plurality of sensors 124 may be accommodated is formed on an inner side surface of an annular part 122a of a conductor holder 122. Thus, a gap S is enlarged according to the size of the notch 122c. Thus, a portion of the sensor 124 is located in the gap S. However, the present disclosure is not limited to this example, and the entire sensor 124 may be located in the gap S.

The substrate 123 is installed on a stator 1 side (that is, on a lower side in an axial direction) than the conductor holder 122 and the magnet 104 in the axial direction, and is mounted on a lower surface of the conductor holder 122.

Figure 4:
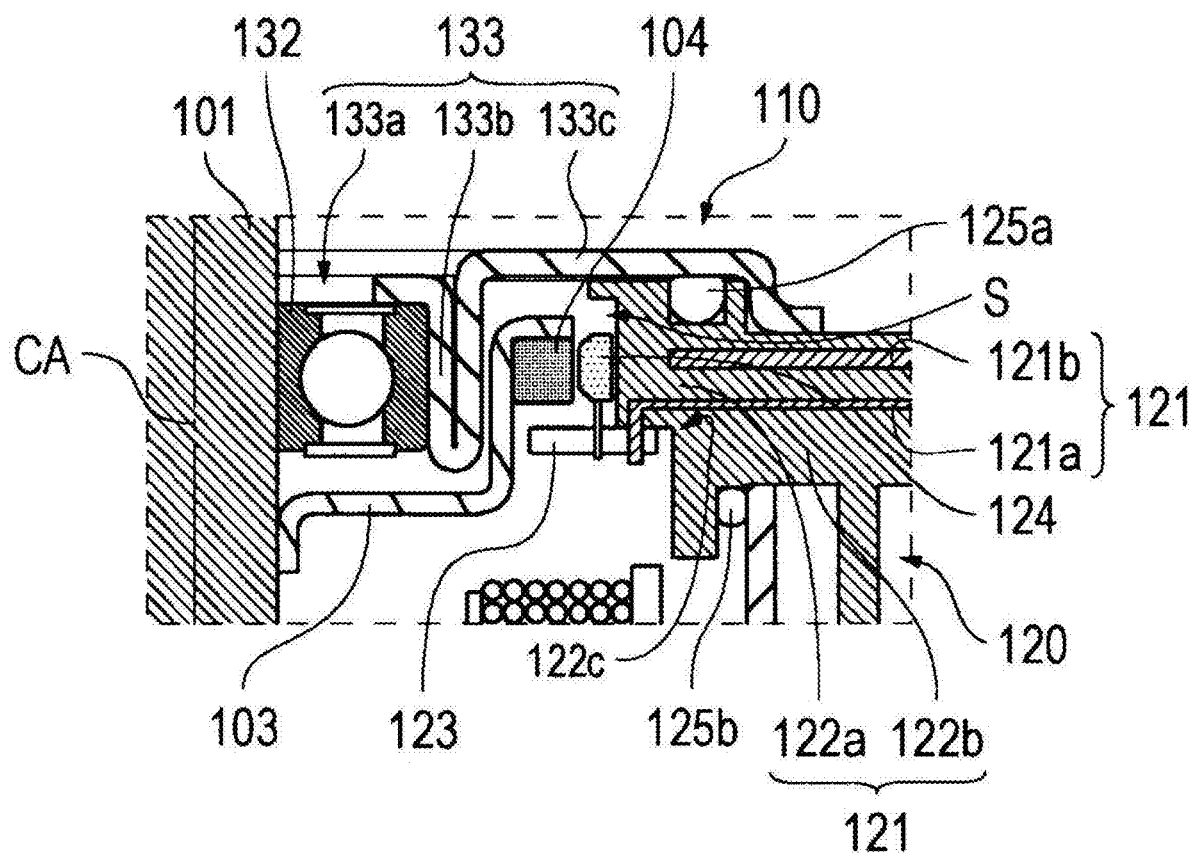
FIG. 4 is an enlarged cross-sectional view illustrating the arrangement of a magnet, a sensor, and a substrate according to a modified example of the second example embodiment of the present disclosure.

In the second example embodiment described above, the substrate 123 is located outside the gap S as shown in FIG. 3, but the present disclosure is not limited to this example, and the substrate 123 may be located inside the gap S. FIG. 4 is an enlarged cross-sectional view illustrating the arrangement of a magnet 104, a sensor 124, and a substrate 123 according to a modified example of the second example embodiment. Further, FIG. 4 corresponds to the structure of a range enclosed by a broken line in FIG. 3.

In the modified example, the substrate 123 is located in a gap S between a bearing holder 133 and a conductor holder 122 as illustrated in FIG. 4. Further, a notch 122c having an arc shape and extending in a circumferential direction is formed on a lower surface of an annular part 122a of the conductor holder 122. The notch 122c is formed by notching a region including an inner peripheral edge in a radial direction of the lower surface of the annular part 122a in an axial direction toward an upper side of the region. The substrate 123 and the sensor 124 are located inside the gap S by mounting the substrate 123 on the notch 122c. A magnet 104 is located upward in the gap S in the axial direction by extending an outer peripheral side of a magnet holder 103 upward in the axial direction. Thus, not only the magnet 104 but also the substrate 123 and the sensor 124 may be located inside the gap S. In the second example embodiment (see FIG. 3), a portion of the magnet 104, the substrate 123, and a portion of the sensor 124 are pushed downward in the axial direction from the gap S, but the space, into which a portion of the magnet 104, the substrate 123, and a portion of the sensor 124 are pushed, in the second example embodiment may be reduced by the configuration of the modified example. Thus, the motor 100 may be miniaturized, and in particular, the size in the axial direction may be miniaturized. Further, a coil 12 and the substrate 123 are further spaced apart from each other, and thus electrical insulation therebetween is easy to achieve. In addition, the work of connecting a conducting wire 12a withdrawn from the coil 12 to one end of a first conductor 121a is facilitated.

Next, a third example embodiment will be described. Configurations of the third example embodiment, which are different from the first and second example embodiments and the modified examples thereof, will be described below. In addition, the same configurations as those in the first and second example embodiments and the modified examples thereof may be denoted by the same reference numerals and descriptions thereof may be omitted.

Figure 5:
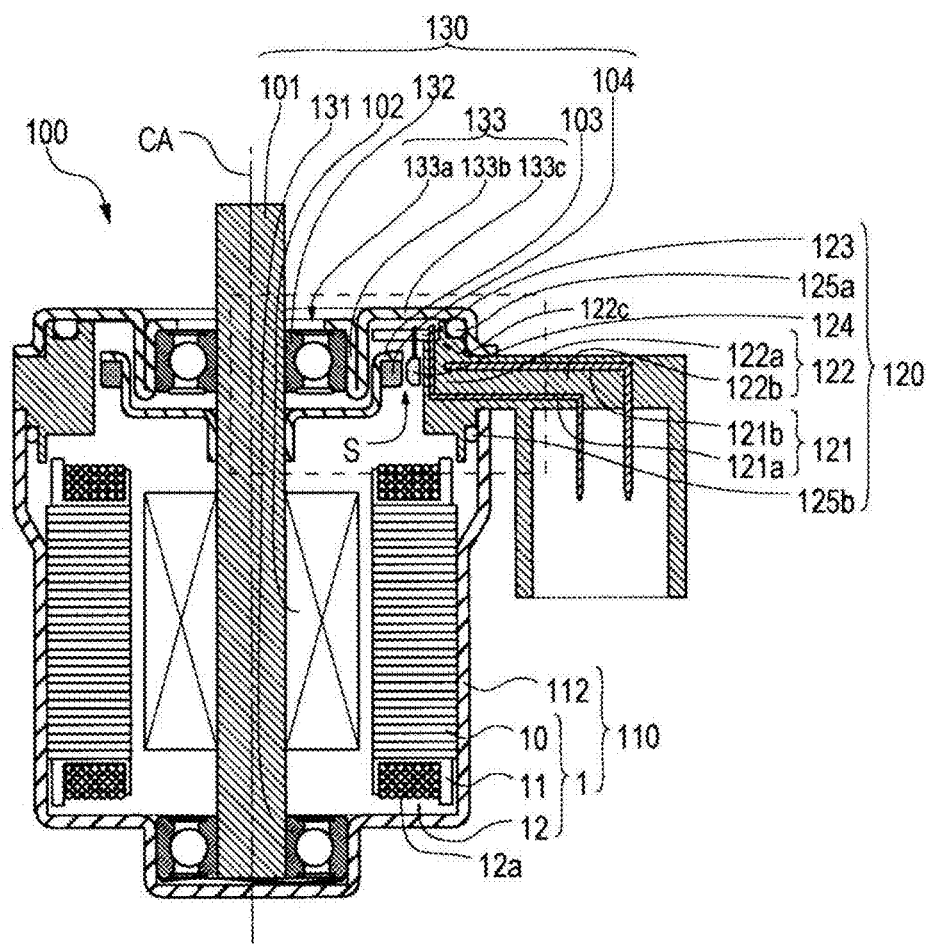
FIG. 5 is a cross-sectional view illustrating a configuration example of a motor according to a third example embodiment of the present disclosure.

FIG. 5 is a cross-sectional view illustrating a configuration example of a motor 100 according to a third example embodiment.

In the third example embodiment, as shown in FIG. 5, a sensor 124 is a lead-type Hall device, is installed on a lower surface of a substrate 123, and overlaps a portion of the trajectory of a rotating magnet 104 in a radial direction. More specifically, the sensor 124 faces the magnet 104 in the radial direction.

The substrate 123 is located in a gap S, is installed on an opposite side of a stator 1 (that is, on an upper side in an axial direction) than a conductor holder 122 and the magnet 104 in the axial direction, and is mounted on an upper surface of the conductor holder 122. More specifically, the substrate 123 is installed on an upper surface of an annular part 122a of the conductor holder 122 and mounted on a notch 122c having an annular shape and extending in a circumferential direction. The notch 122c is formed by notching a region including an inner peripheral edge in the radial direction of the upper surface of the annular part 122a in the axial direction toward a lower side of the region. The substrate 123 and the sensor 124 are located inside the gap S by mounting the substrate 123 on the notch 122c.

Further, in the assembly of the motor 100 of the present example embodiment, first, a bearing assembly 130 from which a second bearing 132 and a bearing holder 133 are omitted is mounted on a housing unit 110. Thereafter, the conductor holder 122 is mounted together with O-rings 125a and 125b. Thereafter, the motor 100 is completed by mounting the second bearing 132 and the bearing holder 133.

Figure 6:
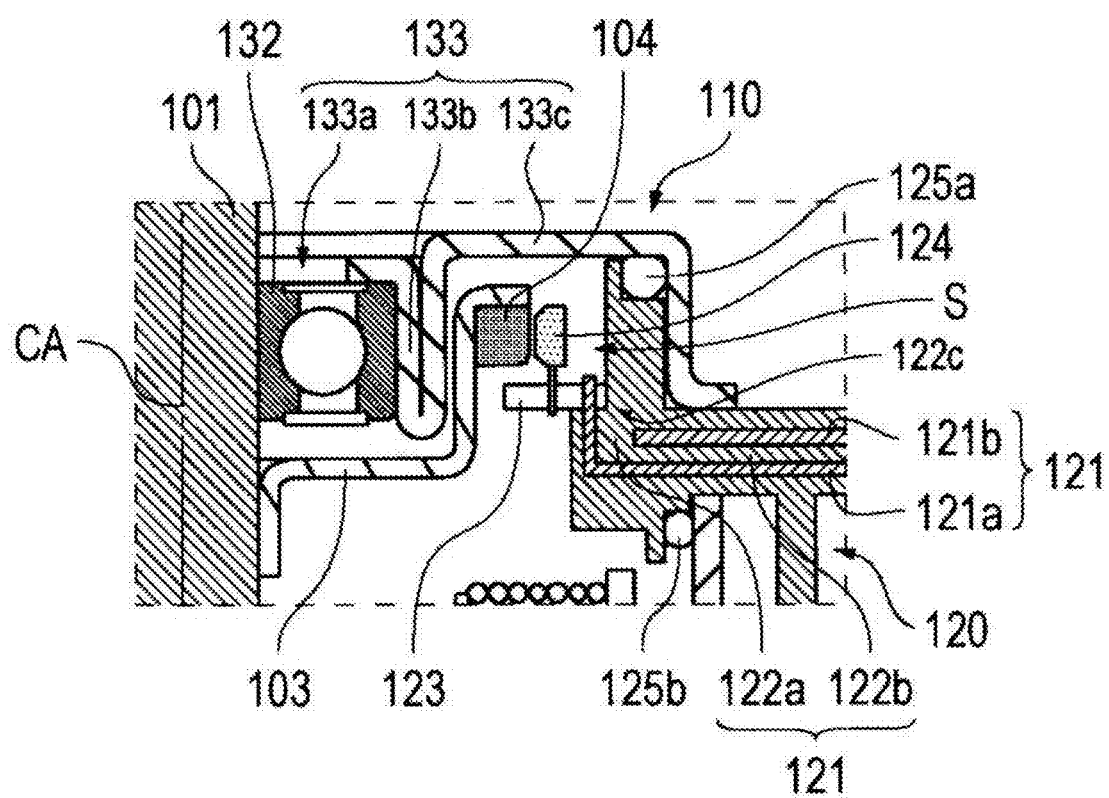
FIG. 6 is an enlarged cross-sectional view illustrating the arrangement of a magnet, a sensor, and a substrate according to a modified example of the third example embodiment of the present disclosure.

Further, the present disclosure is not limited to the example described with reference to FIG. 5, and in the third example embodiment, the substrate 123 may be installed on a position lower than the magnet 104 in the axial direction. FIG. 6 is an enlarged cross-sectional view illustrating the arrangement of a magnet 104, a sensor 124, and a substrate 123 according to a modified example of the third example embodiment. Further, FIG. 6 corresponds to the structure of a range enclosed by a broken line in FIG. 5.

In the modified example, the substrate 123 located in a gap S is provided closer to a stator 1 than the magnet 104 in an axial direction as shown in FIG. 6. Further, the sensor 124 facing the magnet 104 in a radial direction is installed on an upper surface of the substrate 123. More specifically, the substrate 123 is installed on an upper surface of an annular part 122a of a conductor holder 122 and mounted on a notch 122c having an annular shape and extending in a circumferential direction. The notch 122c is formed by cutting out a region including an inner peripheral edge in a radial direction of the upper surface of the annular part 122a in the axial direction toward a lower side of the region. The substrate 123 and the sensor 124 are located inside the gap S by mounting the substrate 123 on the notch 122c. In this manner, for example, a housing unit 110, a conductor assembly 120, and a bearing assembly 130 may be assembled in this order in the axial direction as in the first example embodiment. Thus, the assembly work of the motor 100 is facilitated.

Next, a fourth example embodiment will be described. Configurations of the fourth example embodiment, which are different from the first to third example embodiments and the modified examples thereof, will be described below. In addition, the same configurations as those in the first to third example embodiments and the modified examples thereof may be denoted by the same reference numerals and descriptions thereof may be omitted.

Figure 7:
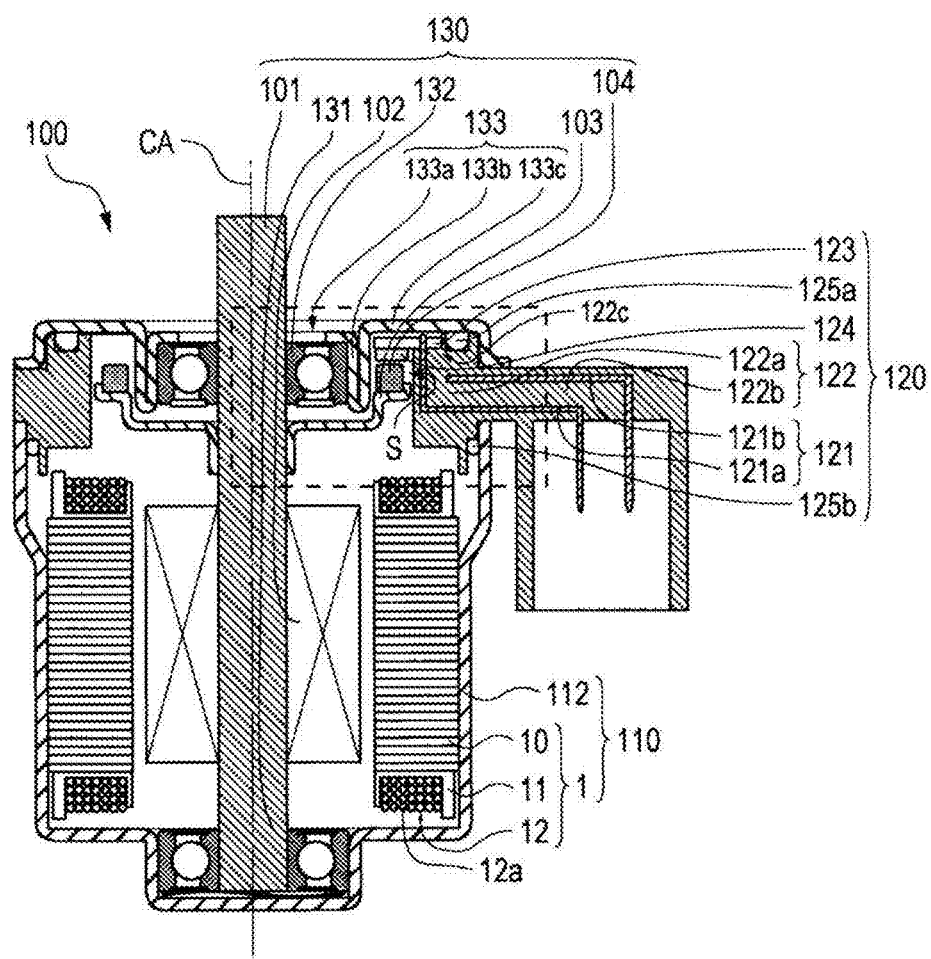
FIG. 7 is a cross-sectional view illustrating a configuration example of a motor according to a fourth example embodiment of the present disclosure.

FIG. 7 is a cross-sectional view illustrating a configuration example of a motor 100 according to the fourth example embodiment. In the fourth example embodiment, as shown in FIG. 7, a sensor 124 is a chip-type Hall device, is installed on a lower surface of a substrate 123, is located on a position higher than a magnet 104 in an axial direction, and overlaps a portion of the trajectory of the rotating magnet 104 in the axial direction. More specifically, the sensor 124 faces the magnet 104 in the axial direction. In this manner, an increase in size of the motor 100 in a radial direction may be suppressed.

The substrate 123 is installed on an opposite side of the stator 1 (that is, on an upper side in the axial direction) than a conductor holder 122 and the magnet 104 in the axial direction, and is mounted on an upper surface of the conductor holder 122. More specifically, the substrate 123 is installed on an upper surface of an annular part 122a of the conductor holder 122 and mounted on a notch 122c having an annular shape and extending in a circumferential direction. The notch 122c is formed by notching a region including an inner peripheral edge in a radial direction of the upper surface of the annular part 122a in the axial direction toward a lower side of the region. The substrate 123 and the sensor 124 are located inside a gap S by mounting the substrate 123 on the notch 122c.

Figure 8:
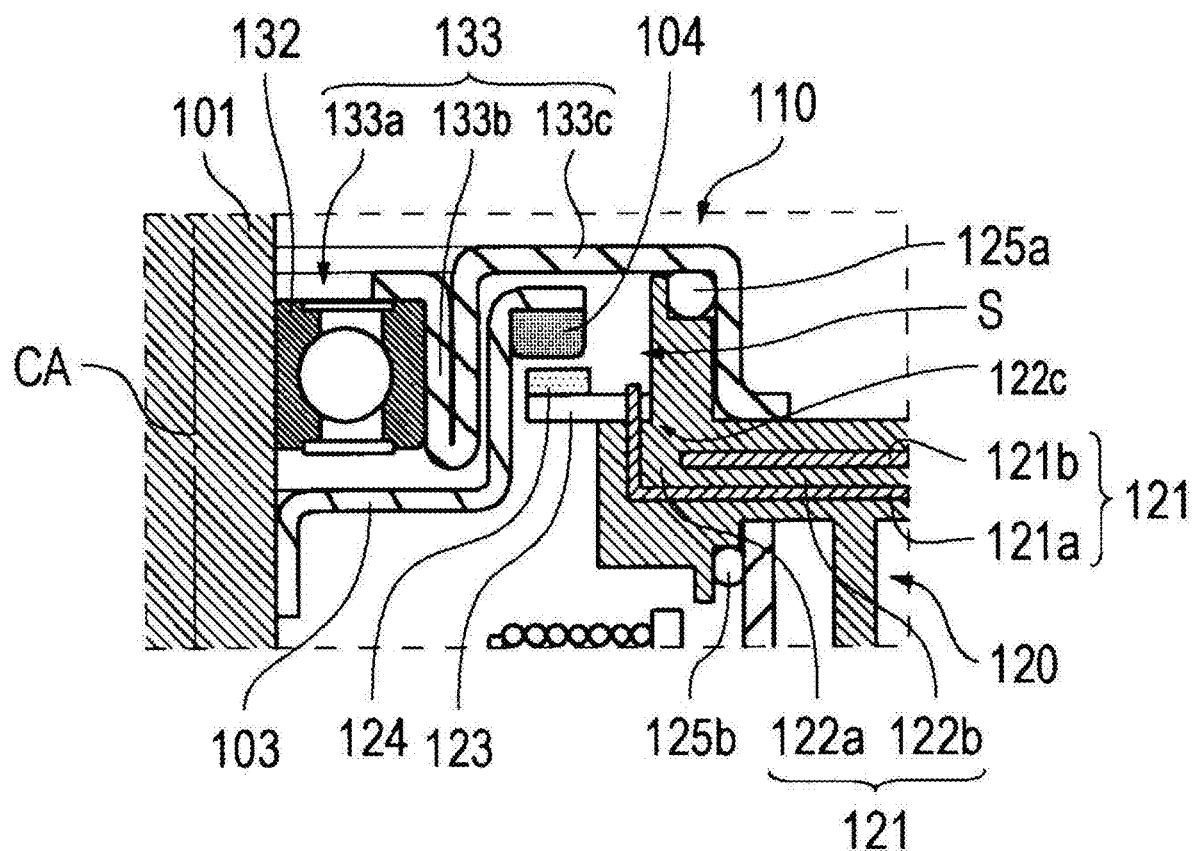
FIG. 8 is an enlarged cross-sectional view illustrating the arrangement of a magnet, a sensor, and a substrate according to a modified example of the fourth example embodiment of the present disclosure.

Further, the present disclosure is not limited to the example described with reference to FIG. 7, and in the fourth example embodiment, the substrate 123 and the sensor 124 may be installed on a position lower than the magnet 104 in the axial direction. FIG. 8 is an enlarged cross-sectional view illustrating the arrangement of a magnet 104, a sensor 124, and a substrate 123 according to a modified example of the fourth example embodiment. Further, FIG. 8 corresponds to the structure of a range enclosed by a broken line in FIG. 7.

In the modified example, the substrate 123 and the sensor 124 located in a gap S are provided closer to a stator 1 than the magnet 104 in an axial direction as shown in FIG. 8. Further, the sensor 124 facing the magnet 104 in the axial direction is installed on an upper surface of the substrate 123. More specifically, the substrate 123 is installed on an upper surface of an annular part 122a of a conductor holder 122 and mounted on a notch 122c having an annular shape and extending in a circumferential direction. The notch 122c is formed by notching a region including an inner peripheral edge of the upper surface of the annular part 122a in the axial direction toward a lower side of the region in a radial direction. The substrate 123 and the sensor 124 are located inside the gap S by mounting the substrate 123 on the notch 122c. In this manner, for example, a housing unit 110, a conductor assembly 120, and a bearing assembly 130 may be assembled in this order in the axial direction. Thus, the assembly work of the motor 100 is facilitated.

The motor 100 described in each of the above-described example embodiments includes a rotor 102 rotatable about a central axis CA extending in the vertical direction, a stator 1 facing the rotor 102 in the radial direction and driving the rotor 102, a housing 112 configured to hold the stator 1, a second bearing 132 located on a position higher than stator 1 in the axial direction and rotatably supporting the rotor 102, a bearing assembly 130 having a bearing holder 133 holding the second bearing 132, a magnet 104 rotating together with the rotor 102, a sensor 124 configured to detect the position of the magnet 104, a substrate 123 on which the sensor 124 is installed, a conductor assembly 120 sandwiched between the housing 112 and the bearing assembly 130. The conductor assembly 120 includes a conductor 121 and a conductor holder 122 covering the conductor 121. The conductor 121 includes a first conductor 121a electrically connected to the sensor 124 through the substrate 123. The substrate 123 is fixed to the conductor holder 122. In the radial direction, a gap S is formed between an outer side surface of the bearing holder 133 and an inner side surface of the conductor holder 122, and at least a portion of the magnet 104 is located in the gap S. Further, the first conductor 121a is a bus bar or a conducting wire.

According to the above-described configuration, the electrical connection between the sensor 124 and the first conductor 121 (for example, a bus bar or a conducting wire) may be facilitated by fixing the substrate 123 on which the sensor 124 is installed to the conductor holder 122. Further, the substrate 123 and the sensor 124 may also be mounted by mounting the conductor assembly 120 when the motor 100 is assembled. Thus, the motor 100 may be easily assembled, and thus the work efficiency of the assembly process of the motor 100 may be improved.

In addition, since at least a portion of the magnet 104 for the sensor 124 is located in the gap S between the bearing holder 133 and the conductor holder 122, the enlargement of the motor 100 may be suppressed, and in particular, the dimension of the motor 100 in the axial direction may be reduced.

The example embodiments of the present disclosure have been described above. The scope of the present disclosure is not limited to the above-described example embodiments. The present disclosure may be implemented with various modifications without departing from the scope of the disclosure. Further, the items described in the above-described example embodiments may be arbitrarily combined within a range in which inconsistency does not occur.

The present disclosure is useful for a motor, for example, having a gap S further outward than a bearing holder in a radial direction.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
    a rotor rotatable about a central axis extending in a vertical direction;
    a stator facing the rotor in a radial direction to drive the rotor;
    a housing to hold the stator;
    a bearing located on a position higher than the stator in an axial direction to rotatably support the rotor;
    a bearing assembly including a bearing holder to hold the bearing;
    a magnet to rotate together with the rotor;
    a sensor to detect a position of the magnet;
    a substrate on which the sensor is located; and
    a conductor assembly between the housing and the bearing assembly; wherein the conductor assembly includes a conductor, and a conductor holder covering the conductor;
    the conductor includes a first conductor electrically connected to the sensor through the substrate, the substrate is fixed to the conductor holder, in the radial direction, a gap is located between an outer side surface of the bearing holder and an inner side surface of the conductor holder, and at least a portion of the magnet is located in the gap; and
    the substrate is closer to the stator then the magnet in the axial direction.

2. The motor of claim 1, wherein the first conductor includes a bus bar.

3. The motor of claim 1, wherein the substrate is located in the gap.

4. The motor of claim 1, wherein at least a portion of the sensor is located in the gap.

5. The motor of claim 1, wherein the substrate is closer to the stator than the conductor holder in the axial direction, and the sensor overlaps a portion of a trajectory of the rotating magnet when viewed in the axial direction.

6. The motor of claim 1, wherein the substrate is closer to the stator than the conductor holder in the axial direction, and the sensor overlaps a portion of a trajectory of the rotating magnet in the radial direction.

7. The motor of claim 1, wherein the substrate is located on an opposite side of the stator than the conductor holder in the axial direction, and the sensor overlaps a portion of a trajectory of the rotating magnet in the radial direction.

8. The motor of claim 1, wherein the substrate is located on an opposite side of the stator than the conductor holder in the axial direction, and the sensor overlaps a portion of a trajectory of the rotating magnet when viewed in the axial direction.

9. The motor of claim 1, wherein the conductor assembly is an integrally molded product including the conductor and the conductor holder.

10. The motor of claim 1, wherein the conductor further includes a second conductor through which a driving current supplied to the stator.

11. The motor of claim 10, wherein
    the stator includes a coil provided on a stator core through an insulator, and an intermediate bus bar provided on the insulator and electrically connected to the coil; and
    the second conductor is electrically connected to the coil through the intermediate bus bar.

* * * * *